Figure 1:
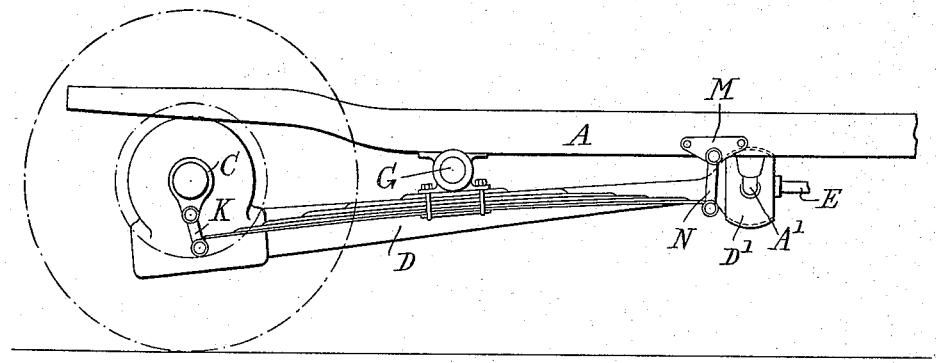

A. A. REMINGTON.
MEANS OF SUPPORTING BODIES OF VEHICLES FROM THEIR AXLES.
APPLICATION FILED JULY 15, 1912.

1,147,547.

Patented July 20, 1915.

Witnesses:
Edmond L. Brown
Anthony F. Greene

Inventor:
Alfred Arnold Remington
by Edmond Congar Brown, Atty

COLUMBIA PLANOGRAPH CO., WASHINGTON, D. C.

UNITED STATES PATENT OFFICE.

ALFRED ARNOLD REMINGTON, OF BIRMINGHAM, ENGLAND, ASSIGNOR TO WOLSELEY MOTORS, LIMITED, OF BIRMINGHAM, ENGLAND.

MEANS OF SUPPORTING BODIES OF VEHICLES FROM THEIR AXLES.

1,147,547.  Specification of Letters Patent.  Patented July 20, 1915.

Application filed July 15, 1912. Serial No. 709,411.

*To all whom it may concern:*

Be it known that I, ALFRED ARNOLD REMINGTON, a subject of the King of Great Britain, and residing at Birmingham, in the county of Warwick, England, designer, have invented certain new and useful Improvements in and Relating to Means of Supporting Bodies of Vehicles from Their Axles, of which the following is a specification.

Broadly describing the invention, as to its main features, it consists in the embodiment of the novel principle of spring-supporting the weight of a vehicle body from an axle in a manner which insures, that, while the entire arrangement of springs which are used in lessening shocks in connection with the axle are effective under vertical movements of the body in relation to the axle, a quicker periodicity will be obtained when rolling than when vertical movements of the body are taking place in relation to the axle, and improved means whereby a quicker periodicity is obtained when rolling relatively to the periodicity simply under vertical movements than is obtainable with ordinary means of spring suspension in which the periodicity under rolling is dependent in any given case on the periodicity under vertical movements, whereby, while comfort is secured under shocks causing vertical movement, excessive rolling is avoided.

The invention comprises also, however, certain features, for use with such embodiment, and with such improved means, which will be hereinafter described.

According to an important feature of the invention the quicker periodicity is obtained through the medium of a transverse member which is carried in bearings of the main frame or body of the vehicle.

Describing, in somewhat general terms, an application of the invention, side springs which are used for the ends, respectively, of the axle, and with which the axle is engaged, are rigidly connected together by a transverse member which is capable of turning in bearings which are fixed in relation to the main frame or body. So long as the axle is exposed simply to shocks which cause vertical oscillation, the transverse member turns somewhat under the movements of the springs due to such shocks, and the full elastic capacity of the springs is utilized. When, however, the vehicle tends to roll over to one side, the effect is that one side spring tends to turn the transverse member in one direction and the other side spring tends to prevent it turning in such direction, with the result that such member does not turn or turns but slightly; and those portions of the springs which depend on the turning of such member to enable them to be effective, are, under such conditions non-effective or substantially so. Each side spring is formed with one portion which extends from the transverse member aforesaid to its engagement with the corresponding end of the axle and with another portion which extends from such transverse member to a connection between its outer end and the frame or body, and conveniently this is provided for by forming each spring as an inverted semi-elliptic spring which is fixed at about its middle to the transverse member and is connected, at the end thereof which is opposite to that which is engaged with the axle, by means of a link, with the frame or body.

A difficulty has been experienced with the ordinary systems of spring suspension used with automobiles, in consequence of the springs being necessarily heavy and having a considerable amount of internal friction or inertia necessitating a considerable change of load to start them moving, rendering them not susceptible to small irregularities of the road, with the result that a car which might possibly be comfortable over large irregularities of the road might be bumpy in passing over small ones, and to overcome this defect frictionless springs have been introduced in addition to the ordinary springs. These additional springs have been found to readily absorb shocks caused by irregularities in the road which are not of sufficient magnitude to substantially affect the main springs, but as a result they make a car very susceptible to rolling.

Now according to a further feature of this invention, supplementary frictionless springs are introduced which will under vertical movements only absorb shocks due to small irregularities in the road and will be substantially non-effective under rolling. In applying this feature of the invention, the supplementary springs are used to connect the ends of the side springs with the frame or body. The use of these frictionless springs (which are conveniently of the spiral type), in combination with the side springs which are fixed to the transverse member as above described, retains all the advantages which such frictionless springs have afforded when used with the ordinary systems of suspension, and avoids the disadvantages incidental thereto, inasmuch as the ends of the side springs which they connect with the frame or body are themselves not substantially affected by the rolling of the vehicle.

The invention is intended for application more especially to supporting a car frame from the rear axle of a motor car, though it is applicable also to supporting a car frame from the front axle, and to supporting a body from an axle of a vehicle other than a motor car.

In applying the invention to supporting a car frame from a rear axle of the well-known live-axle type, the axle may be carried within a tubular casing which is provided with a forward tubular torque and thrust member which is carried at its forward end by the frame through the medium of a universal joint, conveniently of the spherical type, the torque and thrust member inclosing the propeller shaft which is connected with the change-speed gear through the medium of a universal joint, the axle being thus connected with the frame simply through the medium of the universal joint of the torque and thrust member and the springs, all as previously known.

Figure 2:
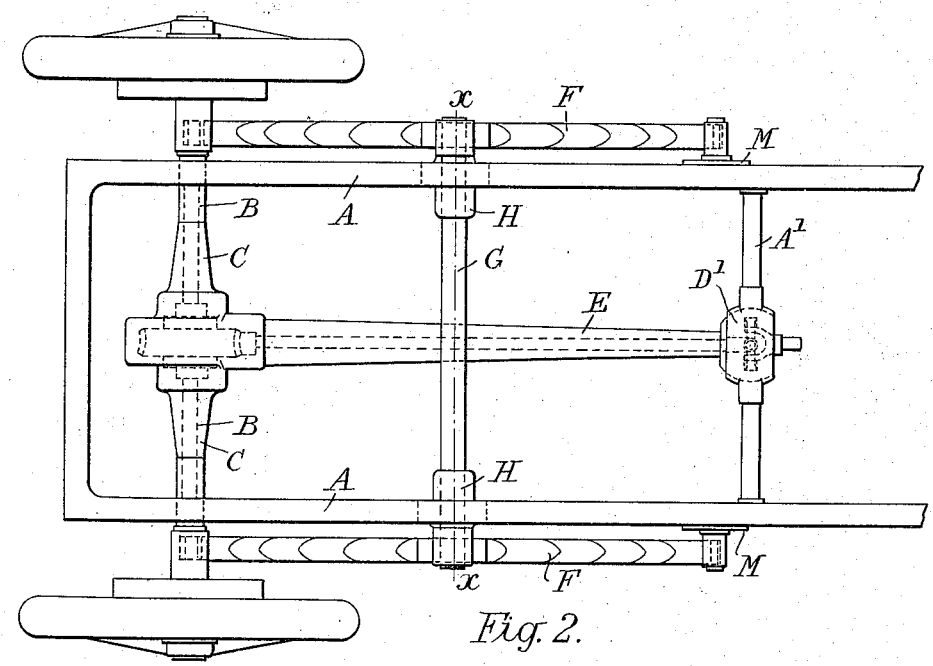
Figure 3:
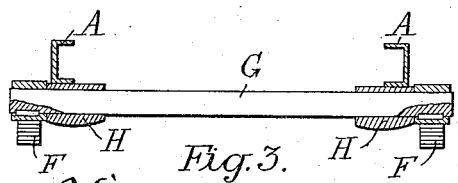

In order that the invention may be clearly understood, and readily carried out in practice, I will now describe, by way of example, and with reference to Figures 1 to 3 of the drawings herewith, a convenient application thereof to the support of a car frame from a rear live axle, and will then describe, so far as is necessary, and with reference to the remaining figure, a modification thereof in which, in combination with the suspension shown by Figs. 1 to 3, frictionless springs are used for absorbing shocks due to small irregularities in the road.

Figure 4:
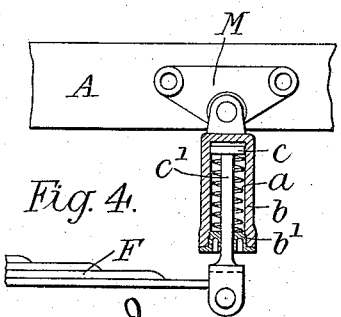

Of the drawings herewith:—Fig. 1 is a side elevation of the rear portion of a motor car frame, showing the means by which the same is supported from the rear axle. Fig. 2 is a plan view of the same. Fig. 3 is a section taken on line $x\ x$ of Fig. 2; and, Fig. 4 shows in side elevation, partly in section, and as far as is necessary to illustrate the same, a modification in which frictionless springs are introduced for absorbing the shocks due to the smaller irregularities in the road.

Referring first to Figs. 1 to 3 inclusive, A is the motor car frame, B the live axle, C the tubular casing which contains the live axle and the differential gear, D the forwardly projecting member of the casing C, which acts as the torque and thrust member and is connected at its forward end by a universal joint $D^1$ with a cross member $A^1$ of the frame and itself incloses the propeller shaft E.

F F are the main side springs, which are fixed at about their middles to the ends, respectively, of a transverse shaft G which is mounted to be capable of turning within bearings H which are fixed to the frame A. Each side spring F is connected at its rear end with the corresponding end of the tubular casing C through the medium of a link K, and is connected at its forward end with a bracket M of the frame A through the medium of a link N.

It will now be seen that, when the axle B is exposed simply to shocks which cause vertical oscillation at both its ends, the shaft G will turn somewhat under the movement of the springs due to such shocks, and allow the full elastic capacity of the springs F to be utilized, whereas, if the car tends to roll over to one side, the rear end of the spring at such side will tend to yield upward in relation to the corresponding end of the shaft G, with the result that one spring will tend to turn the shaft in one direction and the other to prevent it turning in such direction, and consequently the elasticity of the portions of the springs F which are forward of the shaft G will not be utilized in any substantial degree, the elasticity of the springs being confined to substantially their rear portions, that is to say, those portions of the springs only which, together with the shaft G, offer resistance against the tendency of the car to roll.

If it is desired to employ supplementary frictionless springs for absorbing shocks due to small irregularities in the road, such as would not be readily taken up by the main springs F, frictionless springs may be utilized with the links which connect the forward ends of the main springs with the frame, such as in the manner shown by Fig. 4, in which $a$ is a spiral spring within a socket $b$ which is pivoted at its upper end to the bracket M of the frame, this spring being interposed between a piston $c$ within the socket and the closed lower end $b'$ of the socket through which a piston rod $c'$ passes down from the piston $c$ and is pivoted at its lower end to the forward end of the main spring F which is at the corresponding side of the car. Any comparatively small shocks which are transmitted through the axle to the rear ends of the springs F are transmitted, owing to the turning of the shaft G, to the brackets M through the springs $a$, and the rebound of each spring is limited by the corresponding piston $c$ being stopped against the upper end of the socket $b$.

The application of the invention to an axle other than a live axle, and whether of a motor car or other vehicle, will now be readily understood without further description.

Having fully described my invention, what I claim and desire to secure by Letters Patent, is:—

1. In a vehicle, wheels upon which it runs, an axle, springs interposed between the axle and the body in positions at opposite sides of the vehicle, a transverse bar carried in bearings of the main frame and rigidly connected at its ends with said springs at points of the springs which are intermediate their ends, whereby under rolling movements of the frame a portion of each of the said springs is prevented from turning in relation to the corresponding portion of the other spring, and these portions of the springs are consequently rendered non-effective as springs.

2. In a vehicle which runs on wheels and in which the body is supported from an axle by springs, springs at opposite sides of the vehicle, a transverse member carried in bearings of the main frame and rigidly connected with both the springs at points intermediate their ends, said springs each connected at one end with the axle and at the other end with the frame.

3. In a vehicle which runs on wheels and in which the body is supported from an axle by springs, springs at opposite sides of the vehicle, a transverse member carried in bearings of the main frame and rigidly connected with both the springs at points intermediate their ends, said springs each connected at one end with the axle, and frictionless springs interposed between the other end and the frame.

4. In a vehicle which runs on wheels and in which the body is supported from an axle by springs, springs at opposite sides of the vehicle, a transverse member carried in bearings of the frame which is rigidly connected with both the springs at points intermediate their ends, said springs each connected at one end with the axle and connected at the other end with the frame through the medium of frictionless springs.

5. In a vehicle which runs on wheels and in which the body is supported from an axle by springs, side springs of the inverted semi-elliptic type rigidly connected intermediate their ends with the ends, respectively, of a transverse shaft which is carried in bearings of the frame, and connected each at one end with the frame by an endway yielding connection and correspondingly connected at the other end with the axle, substantially as set forth.

6. In a vehicle which runs on wheels and in which the body is supported from an axle by springs, side springs of the inverted semi-elliptic type rigidly connected intermediate their ends with the ends, respectively, of a transverse shaft which is carried in bearings of the frame and pivotally connected each at one end with the frame through the medium of a frictionless spring and at the other end through an endway yielding connection with the axle, substantially as set forth.

7. In a wheeled vehicle, the combination of a main frame, an axle, semi-elliptic springs interposed between said frame and axle and disposed at opposite sides of the vehicle, and a transverse bar adapted to turn in bearings of said frame and rigidly connected with said semi-elliptic springs at points intermediate their ends.

8. In a vehicle, the combination of an axle, a main frame provided with a transverse bearing, a system of springs connected at one end with said frame and at the other end with said axle and comprising longitudinal springs spaced apart, a transverse bar turning in said bearing and rigidly connected with said longitudinal springs between said end connections at a substantial distance therefrom, said bar being under torsional stress exerted in opposite directions during a swaying or rolling tendency of the vehicle body and being free to turn during the vertical rising and falling thereof, whereby during such vertical movements the full capacity of the springs may be brought into play and during such swaying or rolling tendency part of said spring system is rendered inert, said torsional stress of said transverse bar operating to retard or prevent the swaying or rolling of said body.

In witness whereof I have hereunto signed my name this 4th day of July, 1912, in the presence of two subscribing witnesses.

ALFRED ARNOLD REMINGTON.

Witnesses:
 ROBERT G. GROVES,
 EDWARD REEVE.